United States Patent
Nimura et al.

[11] Patent Number: 5,890,088
[45] Date of Patent: Mar. 30, 1999

[54] INFORMATION GUIDANCE SYSTEM BASED ON STRUCTURE CONFIGURATION MAP

[75] Inventors: Mitsuhiro Nimura; Seiji Hayashi; Yasunobu Ito; Keizo Inoue, all of Anjo, Japan

[73] Assignee: Aisin Aw Co., Ltd.

[21] Appl. No.: 739,323

[22] Filed: Oct. 29, 1996

[30] Foreign Application Priority Data

Oct. 31, 1995 [JP] Japan .................................. 7-284256
Oct. 31, 1995 [JP] Japan .................................. 7-284257
Oct. 31, 1995 [JP] Japan .................................. 7-284258

[51] Int. Cl.⁶ ............................................... G06G 7/78
[52] U.S. Cl. ........................ 701/211; 701/208; 340/988; 340/990; 340/995
[58] Field of Search ..................... 701/200, 201, 701/202, 207, 208, 209, 211, 212; 340/990, 988, 995, 460; 73/178 R

[56] References Cited

U.S. PATENT DOCUMENTS

| | | | |
|---|---|---|---|
| 5,121,326 | 6/1992 | Moroto et al. | 701/212 |
| 5,371,497 | 12/1994 | Nimura et al. | 701/209 |
| 5,525,883 | 6/1996 | Avitzour | 318/587 |
| 5,537,324 | 7/1996 | Nimura et al. | 701/208 |
| 5,587,911 | 12/1996 | Asano et al. | 701/202 |

FOREIGN PATENT DOCUMENTS

| | | |
|---|---|---|
| 0524814 | 1/1993 | European Pat. Off. . |
| 0579451 | 1/1994 | European Pat. Off. . |
| 3744533 | 7/1989 | Germany . |

OTHER PUBLICATIONS

Proceedins of the Vehicle Navigation & Info Sys. Conf. Oct. 20–Oct. 23, 1991, vol. 1, No. 20, Oct. 1991.

Primary Examiner—Jacques H. Louis-Jacques
Attorney, Agent, or Firm—Lorusso & Loud

[57] ABSTRACT

A structure configuration map display system includes a controller for depicting and displaying a structure configuration map based on structure configuration map information. The system provides for searching and guidance relative to a structure designated as a target point. A display form corresponding to the structure information for the target point is determined and the display form of the target point is changed based on the results of that determination and is displayed so that a user can easily recognize the desired facility by its display form which corresponds to stored structure information. Also, the user can easily identify a facility as the desired facility and can obtain reliable guidance to that target point by the display form which indicates the type of the structure.

15 Claims, 18 Drawing Sheets

FIG. 6

Table for mark selecting conditions

| Type | Conditions | Mark No. |
|---|---|---|
| Number of stories (floors) | 1 | a |
| | 2 | b |
| | 3~5 | c |
| | 6 or more | d |
| Number of names | 0~1 | a |
| | 2 | b |
| | 3~10 | c |
| | 11 or more | d |
| Area (m2) | 0~150 | a |
| | 151~250 | b |
| | 251~600 | c |
| | 601~1200 | d |
| | 1201 or more | e |

FIG. 7
| Mark No. | Mark | Type |
|---|---|---|
| a |  | One-storied private house |
| b | 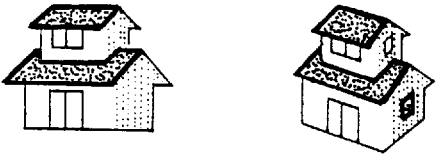 | Two-storied private house |
| c | 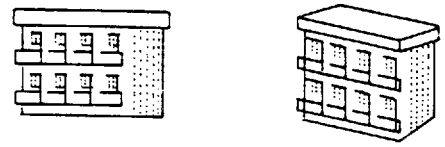 | Apartment |
| d |  | Condominium |
| e |  | Villa |

FIG. 19

Information is displayed

| Information | Return | Desti-nation | Transit point | Memory |

Name   Aiue Co., Ltd.

Telephone number   03-3834-xxxx

Address   No. 203 Tokyo Building △-○,
1-chome, Ueno, Taito-ku, Tokyo

FIG. 20

Vicinity information is searched

| List of vicinity information categories |
| --- |
| Manufacture and sale of textile and woven goods |
| Dyeing and desigin of textile and woven goods |
| Clothes, dry goods, accessories |
| Other products |
| Daily necessaries, sundry goods, stationary, toys |
| Cosmetics, decorations, folk-art articles |
| Leather products and others |
| Agriculture and forestry, horticulture |

FIG. 21

| Vicinity information is searched | |
|---|---|
| Grains, noodles, bread, cakes | 37 items |
| ○○○○ rice shop | 0 m |
| ×××× bakery | 10 m |
| Confectionery △△△ | 15 m |

INFORMATION GUIDANCE SYSTEM BASED ON STRUCTURE CONFIGURATION MAP

BACKGROUND OF THE INVENTION

The present invention relates to an information guidance system for setting a desired target point (destination) based on a structure configuration map indicating configuration of structures according to rows of coordinates, and in particular, to an information guidance system based on a structure configuration map, by which it is possible to identify a target facility by changing display form of a preset structure, to facilitate setting of a target point or to display the target point with emphasis.

In the various types of guidance systems utilizing a map display, marks such as a flag or a circle are used to indicate a target facility and to provide guidance. For example, in the case of guidance along a route from Tokyo Station to the Sunshine Building, the Sunshine Building might be set as a target point by inputting name, telephone number, etc. Then, a map of the vicinity of the building would be displayed, with a flag or a circle indicating that the Sunshine Building is the target point. A route to reach the target point is searched, and navigation guidance is provided along the suggested route.

However, when a target point is identified on a display by a unified mark such as a flag or circle, the user is not advised as to the nature or type of facility of the target point.

In the type of navigation system in which a user inputs the target point as a telephone number or address, by manual operation, a map of the vicinity of the thereby identified target point is displayed. Then, an optimal route is searched, and navigation guidance is provided along the suggested route. If the user already knows the telephone number or address, it is relatively easy to input the telephone number or address by manual operation, but if the user has no knowledge of such data, it is necessary to refer to a telephone directory or other reference, and it is not very easy to learn and input such data.

In another type of route guidance system, a map screen is displayed, and the target point is set by input through the display screen to identify a point on the displayed map. However, in setting the target point on a displayed map, it is difficult for the user to recognize exactly the point which the user wants to set. For example, if a cursor is moved on the map screen to set the target point, it is sometimes difficult to judge which point the cursor is currently indicating.

SUMMARY OF THE INVENTION

It is an object of the present invention to provide information guidance based a structure configuration map.

It is another object of the present invention to make it easy to recognize the target point or target facility which the user wants to find.

It is still another object of the present invention to obtain structure information for the structure already set and to change the display form of the target structure to differentiate it from the other facilities, in accordance with the retrieved structure information.

It is yet another object of the present invention to facilitate input of the target point.

The system according to the present invention provides information based on structure configuration map information stored in storage means. Prestored information includes the structure configuration map information, information on target points, and display form change data. The system further includes structure configuration map display control means for depicting and displaying a configuration map, searching and guidance processing means for searching and providing guidance to a structure at a target point, and display form change control means for reading display form change data in said storage means according to the structure information for the target point searched by the searching and guidance processing means and for displaying a changed display form for the target point.

The structure configuration map information prestored in the storage means includes coordinate data for the configuration of each structure and facility and other information relating to the various structures and facilities. The structure configuration map display control means depicts and displays a structure configuration map based on structure configuration map information retrieved from storage.

The system of the present invention further includes input/output control means for controlling input/output of information to and from an external electronic device, searching means for searching for a specified point, e.g. target point, in the structure configuration map information, based on the information input from an external electronic device or from other externally input information, and notifying means for communicating to the user information input from outside or information pertaining to the target point. Also included are operating means for setting a target point, detecting means for detecting coordinates for the site identified by use of the operating means, and searching means for searching to identify a structure associated with the coordinates of the operating site detected by the detecting means, whereby the structure configuration map display control means displays with emphasis on the identified structure and/or information relating to the identified structure on the map.

BRIEF DESCRIPTION OF THE DRAWINGS

FIG. 6 represents a mark selecting condition table;

FIG. 7 shows a mark table;

FIG. 19 is an example of a guidance screen with display of information based on the structure configuration map;

FIG. 20 represents an example of a menu display screen presenting information for the vicinity of the building;

FIG. 21 shows an example of a category menu screen; and

DESCRIPTION OF THE PREFERRED EMBODIMENTS

Preferred embodiments of the present invention will be now described with reference to the drawings.

Figure 1:
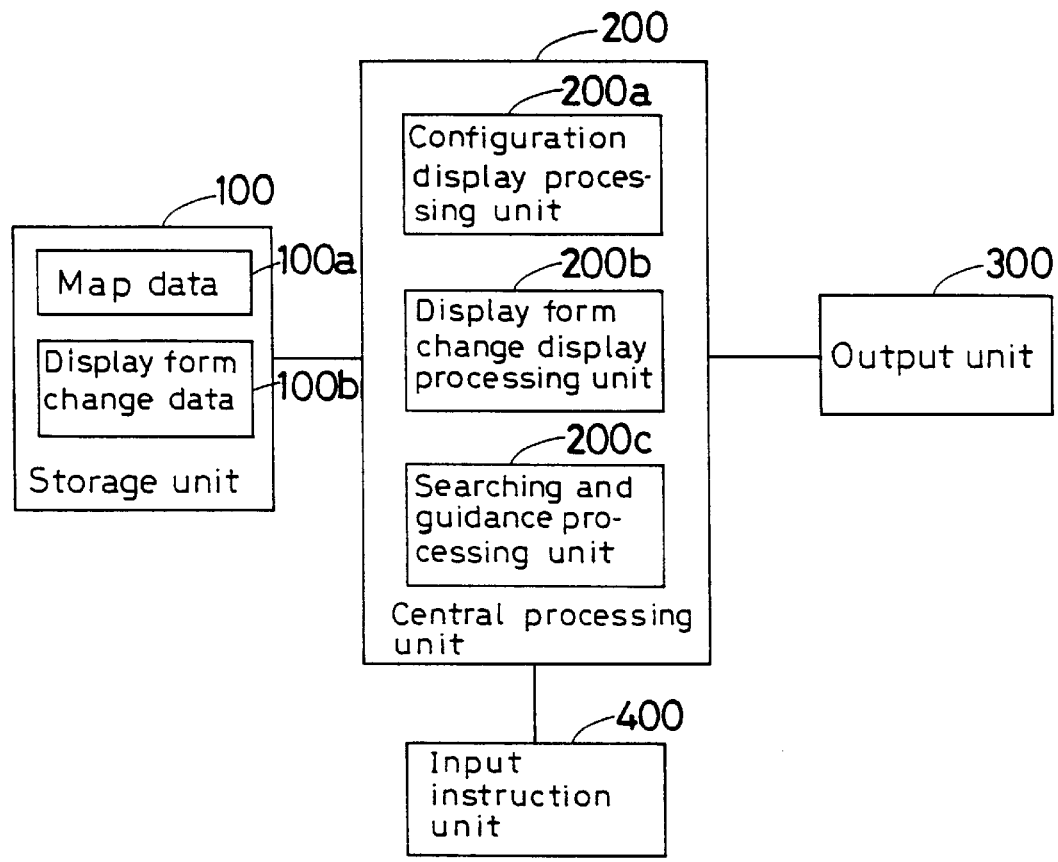
FIG. 1 is a block diagram of an embodiment of an information guidance system based on a structure configuration map according to the present invention.

FIG. 1 shows a storage unit 100, which stores structure configuration map data 100a for depicting and displaying the so-called structure configuration such as architecture (detached homes, office buildings, condominiums, fire stations, department stores, hospitals, stations, etc.), facilities (towers, parks, amusement parks, sports grounds, etc.), bridges, roads, and display form change data 100b for changing the display form of a target point and for making it more easily recognizable. Further, road map data, housing map data, etc., may be stored. The structure configuration map data 100a contains rows of coordinates including a plurality of coordinate values for depicting and displaying configuration, name and address of the structures, various types of information relating to the structures, e.g. type of structure, height, other details (residents), and information such as telephone number. The display form change data 100b is the data for changing the display form depending upon type, area, etc., of private housing, facilities, etc., apartments, of the building when a target point is set on a map, and it comprises different marks for each type of structure and area of the structure, and 3-dimensional graphical data.

A central processing unit 200 reads data for a structure configuration map to be displayed from the storage unit 100 and depicts and displays a configuration map of structures based on rows of coordinates, type and height of the structures and other detailed information, (scale of arrangement). When a structure is selected in the display structure configuration map, the display form change data is read from the storage unit 100. Then, the display form of the selected structure is changed and displayed with emphasis, or information relating to the structure or information on the vicinity of the selected structure is searched and output, or, in the alternative, a configuration map for the vicinity of the structure is displayed based on the information relating to the structure. The configuration display processing unit 200a draws a housing map based on type, height and scale of the structure and depicts and displays names of major configurations on the configuration map. The display form change display processing unit 200b selects and displays a mark depending upon the type, area, etc., of the structure and processes and displays a simulated 3-dimensional display. The searching and guidance processing unit 200c searches for and outputs various types of information relating to the structure, e.g. list of names of companies, offices, stores, etc., in the building, telephone numbers and similar information for the vicinity of the structure, or searches to identify and characterize the selected structure based on telephone number or name and provides guidance on the configuration map. The output unit 300 includes a display unit for displaying a structure configuration map and/or guidance information, a printer, etc. The input instruction unit 400 inputs selection of and instruction for, within the area of the selected structure on the map, searching of guidance information and vicinity information, and output range (area) of the structure configuration map. For example, a printing device, remote controller, etc., such as a touch panel, joystick, mouse, etc., may be combined with the display screen of the output unit 300.

Figure 2:
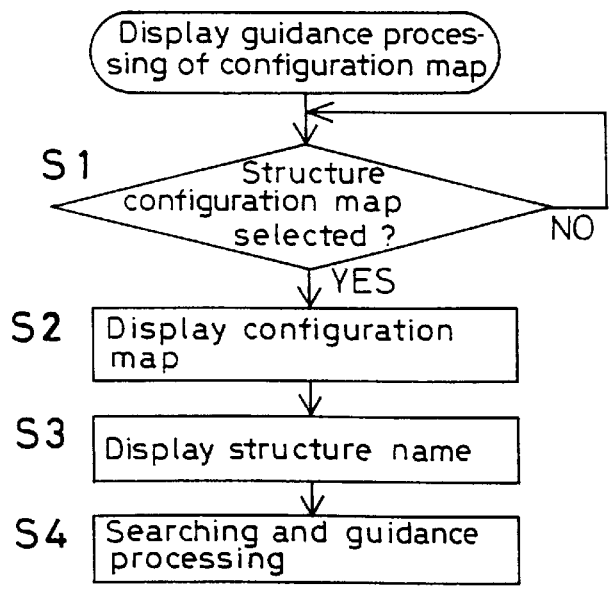
FIG. 2 is a flow chart of a routine for display and guidance processing of a configuration map by the information guidance system.

In the central processing unit 200, when the structure configuration map is selected (Step S1) with the road map displayed in the selected scale as shown in FIG. 2, display processing of the configuration map is first executed (Step S2), and the name of the structure is displayed on the configuration map screen (Step S3). Then, for information relating to the structure, e.g. if it is a building, tenants of the building such as stores, offices, etc., name and type of business, details of business activities, telephone number, etc., of the tenants, searching and guidance processing is performed based on the structure configuration map (Step S5). The configuration of the structure is planar in the case of general housing, building or other architecture, and is planar topography if it is a park or a road.

Figure 3A:
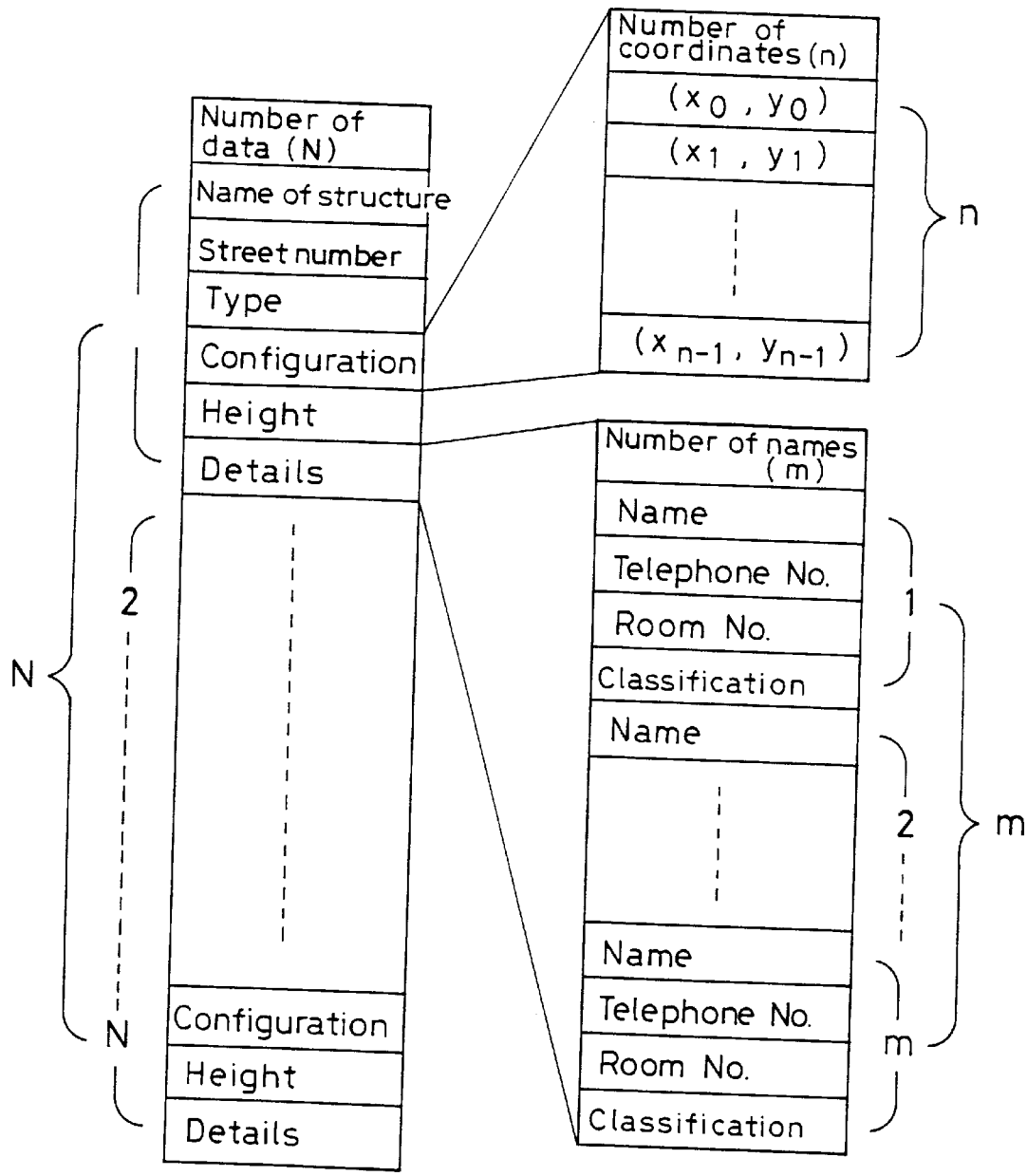
FIGS. 3(A) and 3(B) show examples of the structural configuration of the map data.
Figure 3B:
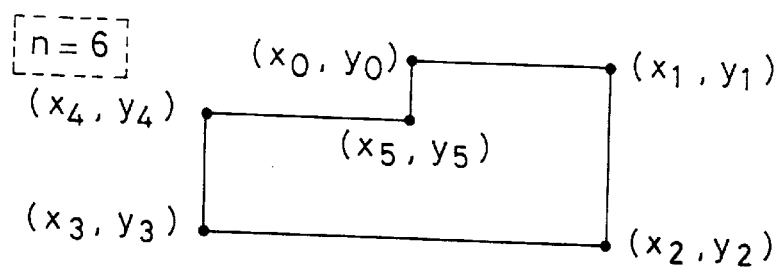

The data structure of the data for the structure configuration map stored in the map data storage unit 110, includes data for each of "N" structures which is stored after the ID No. "N" of the structure as shown in FIG. 3 (A). The data for each structure comprises the name of the structure, street number (address), type, shape, height and other details. The name is the name of building if it is a building. If it is a private house, the name is the name of the resident. If it is a facility, it is the name of the facility. If it is a road, it is type of road and the name of the road such as "Central Street", "National Highway No. 1". The street number (address) is the street number of that structure. Configuration of structure is number of coordinates (n) used to indicate configuration, and the coordinate values ($x_0$, $y_0$), ($x_1$, $Y_1$), . . . ($X_{n-1}$, $Y_{n-1}$). The type of structure means information such as detached homes, condominiums, office buildings, public facilities, roads, parks, etc. The height may be given as either the number of floors (stories) or as the height of the building, e.g. in meters. The "details" are information relating to each resident if it is a tenant building, for example, information relating to the number (m) of tenants, tenant names, telephone numbers, room numbers, classification (type of business, details of business activities such as restaurant, convenience store, . . . ). Therefore, as shown in FIG. 3(B), a planar shape can be shown for a building or house or for the topographical shape of a park and output by reading coordinate values in succession as the information relating to configuration of the structure and by connecting the read (retrieved) coordinates by lines and then displaying the connected configuration.

Figure 4:
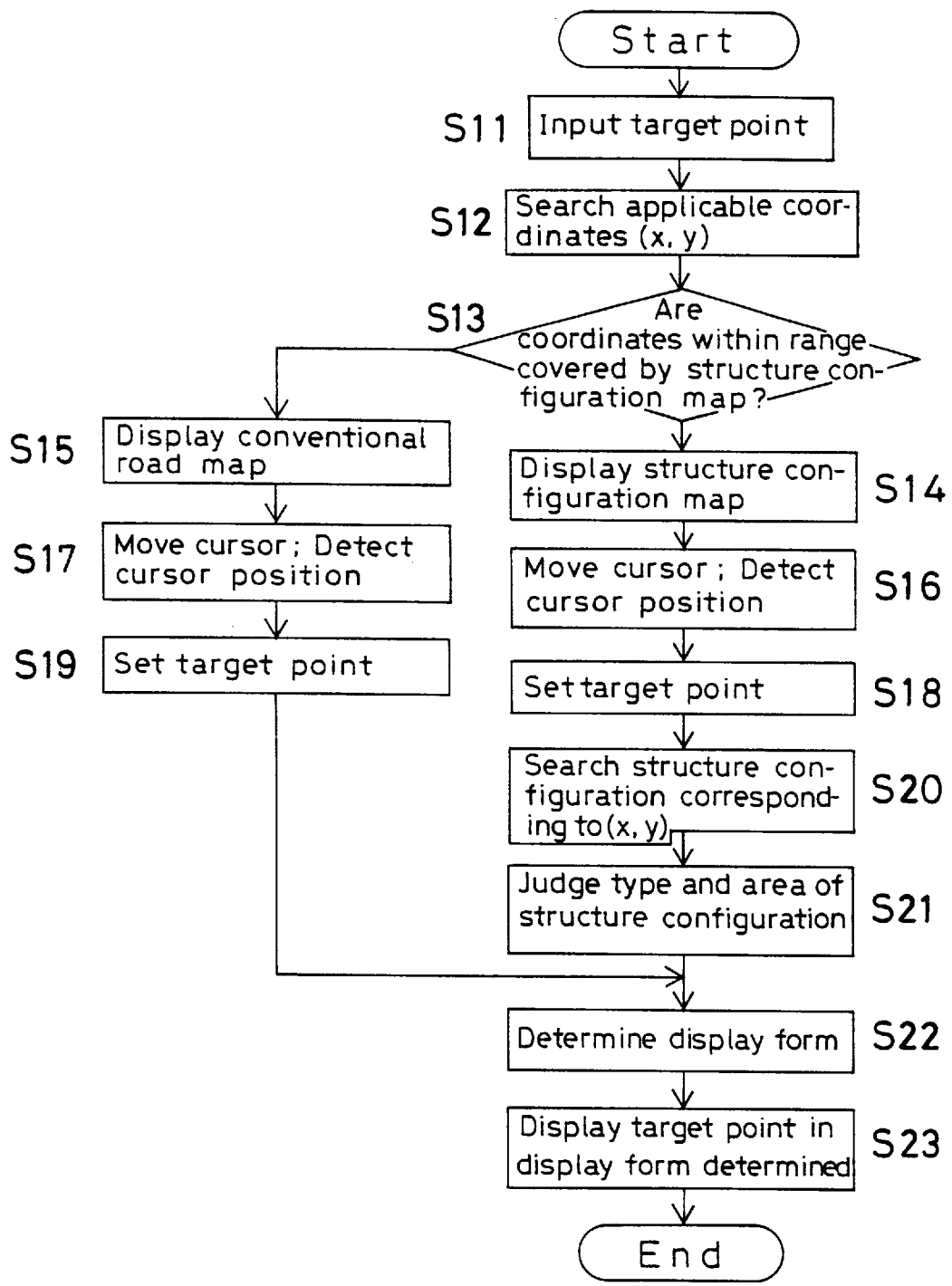
FIG. 4 is a flow chart of a subroutine for changing display form according to the present invention.

The subroutine for changing the display form of the target point is shown in FIG. 4. The data for a structure configuration map is designed with rows of coordinates stored as configuration data. The map coordinates in a row are read in succession and are then connected by lines and displayed.

Figure 5A:
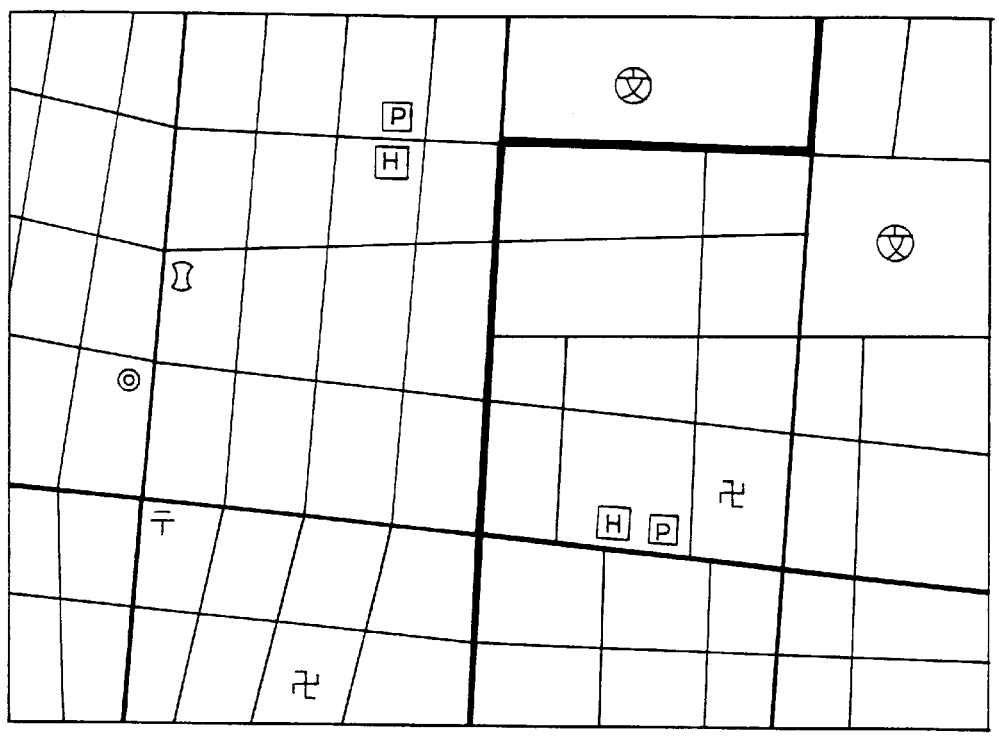
FIGS. 5(*a*) and (*b*) are examples of structure configuration maps.
Figure 5B:

For example, a road map as shown in FIG. 5(a) would be displayed as a structure configuration map, as shown in FIG. 5(b).

The data for a structure configuration map is not necessarily retrieved for all areas. For this reason, when the target point is input using coordinates and telephone number, the input coordinates (x, y) are searched, and it is determined whether or not the input coordinates are present within the scope (area) covered by the structure configuration map (Steps S11–S13). If the coordinates are within the scope of the structure configuration map, the structure configuration map is displayed (Step S14). If not, a conventional road map is displayed (Step S15). Then, the cursor is moved on the screen, and when cursor stops, position of that point is detected and set as a target point (S16–S19). In the case where a structure configuration map is displayed, configuration of the structure corresponding to the inputted coordinates (x, y) is searched. The type of configuration and area of the searched structure (S20–S21) is judged and display form is determined (S22). In the case where a conventional road map is displayed (step S15), the display form is determined after the target point has been set.

FIGS. 6 and 7 show examples of (marks) for display of various structures on a structure configuration map.

FIG. 6 represents an example of a mark selecting condition table. For example, the marks Nos. "a" to "d" correspond to numbers of floors of 1, 2, 3 to 5 and 6 floors or more, respectively. Marks Nos. "a" to "d" correspond to personal names, telephone numbers, etc., number of names being 0 to 1, 2, 3 to 10, 11 or more. Marks Nos. "a" to "e" correspond to areas (m$^2$) of 0 to 150, 151 to 250, 251 to 600, 601 to 1200, and 1201 or more, respectively.

Marks Nos. "a" to "e" are registered, for example, in a mark table as shown in FIG. 7, and represent, respectively, a single story private home, two-storied private home, an apartment building, a condominium, and a villa, respectively.

Therefore, the type of the searched structure is judged, and if the number of floors is 3 to 5 floors, for example, Mark No. "c" is selected from the condition table of FIG. 7. Then, referring to the mark table of FIG. 7, the mark indicating an apartment building is accessed and displayed. Also, if the number of names of the searched structure is 11 or more, Mark No. "d" is found on the mark selecting condition table, and the mark indicating a condominium is selected and displayed. If area of the searched structure is 1201 m$^2$ or more, Mark No. "e" is located in the mark selecting condition table, and the mark indicating a villa is selected and displayed.

Only the structure corresponding to the input is displayed and the other structures (such as buildings, houses, factories, etc.) are erased from the configuration map display. Thus, the display shows only the topographical (land) features such as roads, rivers, railroads, etc., and the target point. Thus, the target point is displayed with emphasis. Because roads, rivers, railroads, etc., are displayed, the position of the target point can be related to such features and distinctly identified.

When the position of the cursor is detected and the target point is set, the indicated structure is searched. In place of a planar block representing the structure, a 3-dimensional mark selected by the central processing unit is displayed. Thus, the target structure can be more easily recognized by displaying it as it is really built.

The marks are not limited to those shown in FIG. 7. As exemplified by A in FIG. 8, the target structure may be displayed in a simulated 3-dimensional depiction to make it more easily recognizable.

Thus, in the present invention, the display form of the facility is changed to match information for the structure so that the user can easily recognize the facility. If the display form is changed in the area of the facility so as to provide structure information, it is possible to know the size of the facility, and to more easily recognize the actual facility. By changing the display form to match the type of structure, it is easier to characterize the target facility, and it is possible to provide more reliable guidance to the target point. Because several types of marks are prestored as different display forms and one of these stored marks is selected and displayed depending upon type and area of structure, the process of changing the display form is simplified. As another display form, a simulated 3-dimensional display may be provided after deciding the display form so that the target point is shown in relief. If all structural representation (marks) are erased except that for the selected target, it is possible to more effectively identify the target.

Figure 9:
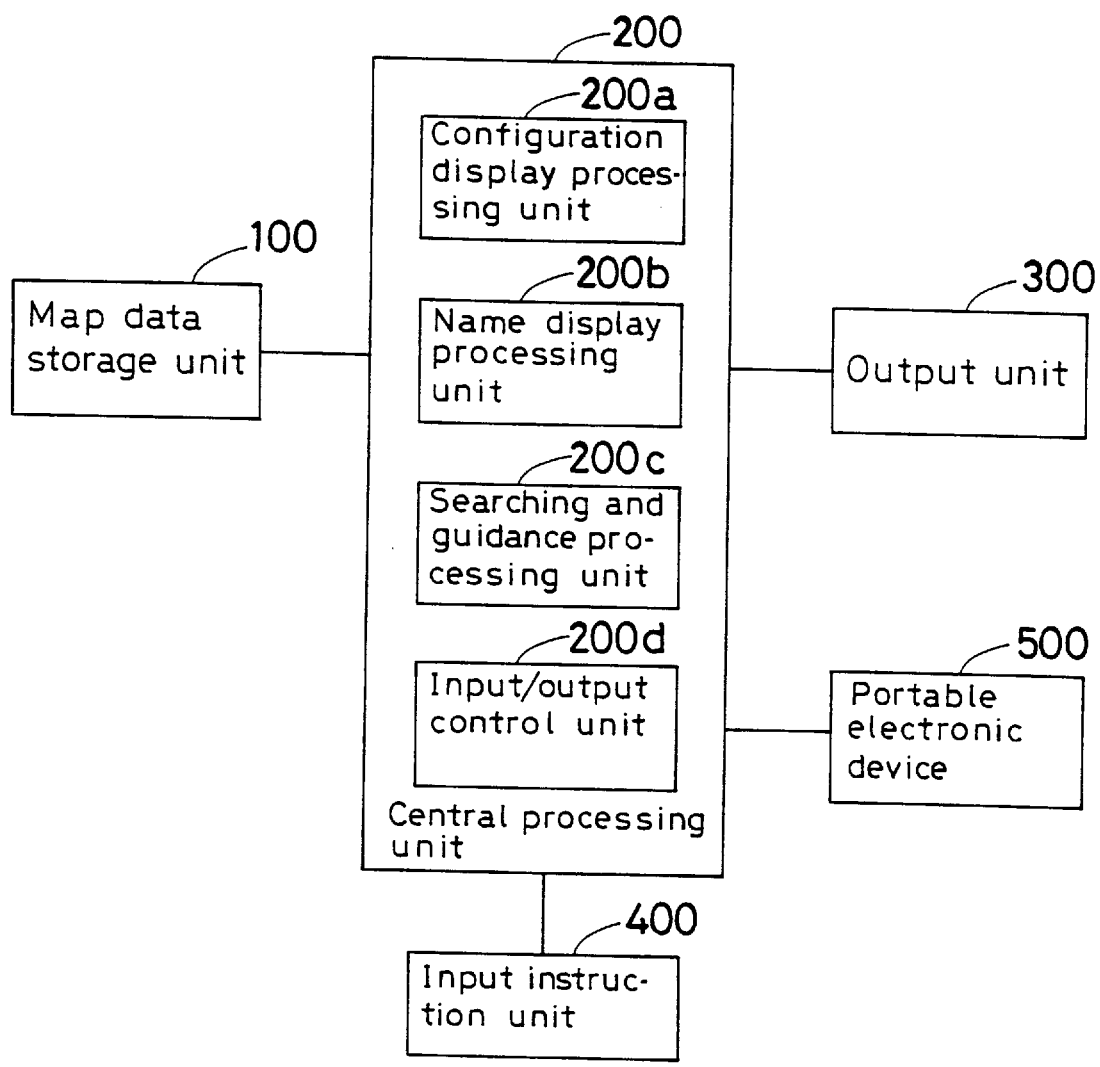
FIG. 9 is a block diagram of a second embodiment of the present invention.

FIG. 9, shows a second embodiment having a basic arrangement the same as in FIG. 1, except that the central processing unit 200 further includes a name display processing unit 200b' and an input/output control unit 200d, and that a portable type electronic device S00 is connected to the central processing unit 200.

Describing now only the features which differ from FIG. 1, the name display processing unit 200b' depicts and displays names of major objects on the configuration map displayed by the configuration display processing unit 200a.

The input/output control unit 200d controls exchange of data between the central processing unit 200 and the portable electronic device 500 (personal computer, note type electronic device, etc.) via an interface (not shown). For example, it controls transfer of information such as telephone number lists, address lists, map of the vicinity of the destination and information relating to points such as facilities for storage in the storage unit 100, and transfer of information stored in the storage unit 100 to the portable electronic device. Therefore, it is possible, for example, to input a simple map of the vicinity of the destination through the portable type electronic device, and to use the central processing unit to search for the desired point on the structure configuration map based on the feature of the inputted map, in particular, the facilities near the destination, road configuration, names of places etc., and to provide guidance on a map including the desired (target) point. It is also possible to externally input by reading the map with a scanner, for use by central processing unit 200 in searching for the desired point. If the information stored in the portable electronic device is transferred to and registered in a navigation system, it is possible to read and utilize the registered data when inputting the desired point, and this reduces burden on the user in inputting a target point.

Figure 8:
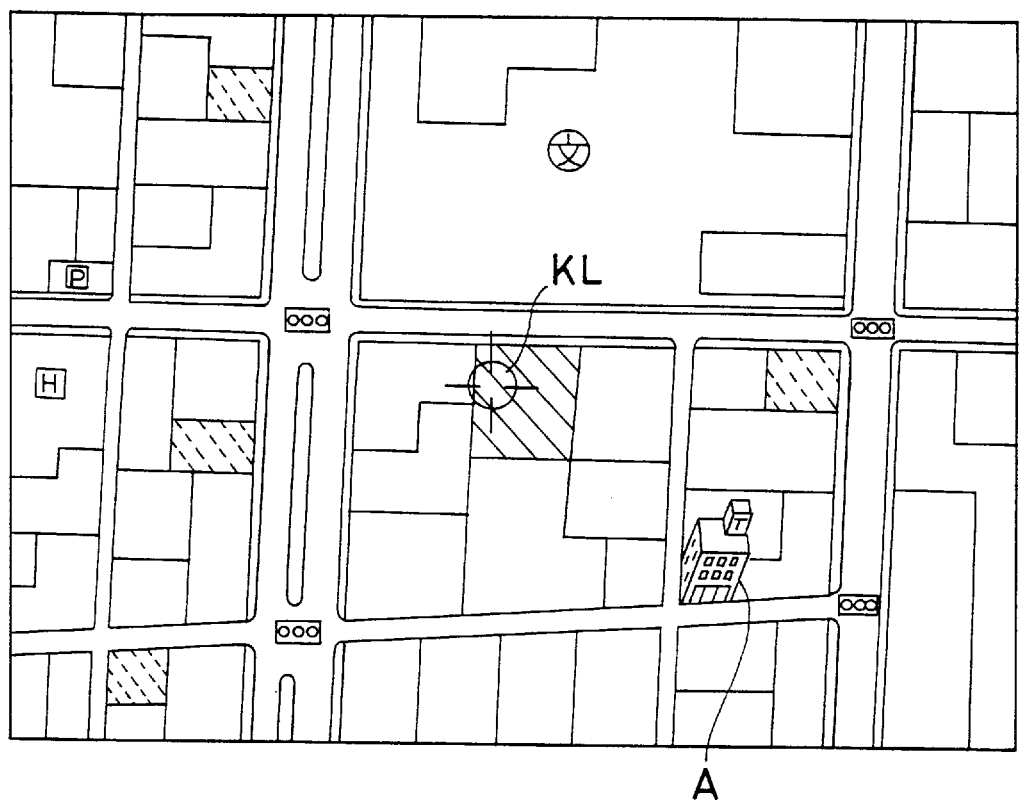
FIG. 8 is an example of a simulated 3-dimensional display.

Setting of the target point will now be described referring to FIG. 10 and FIG. 11. As described above, the structure configuration map is depicted and displayed by reading rows of coordinates stored as configuration data and by connecting them by lines. To the road map shown in FIG. 5 (a), structure configuration is added and displayed as shown in FIG. 5(b). On this structure configuration map, the target point can be input by moving the cursor KL to the desired point as shown in FIG. 8 and by clicking it.

Figure 10:
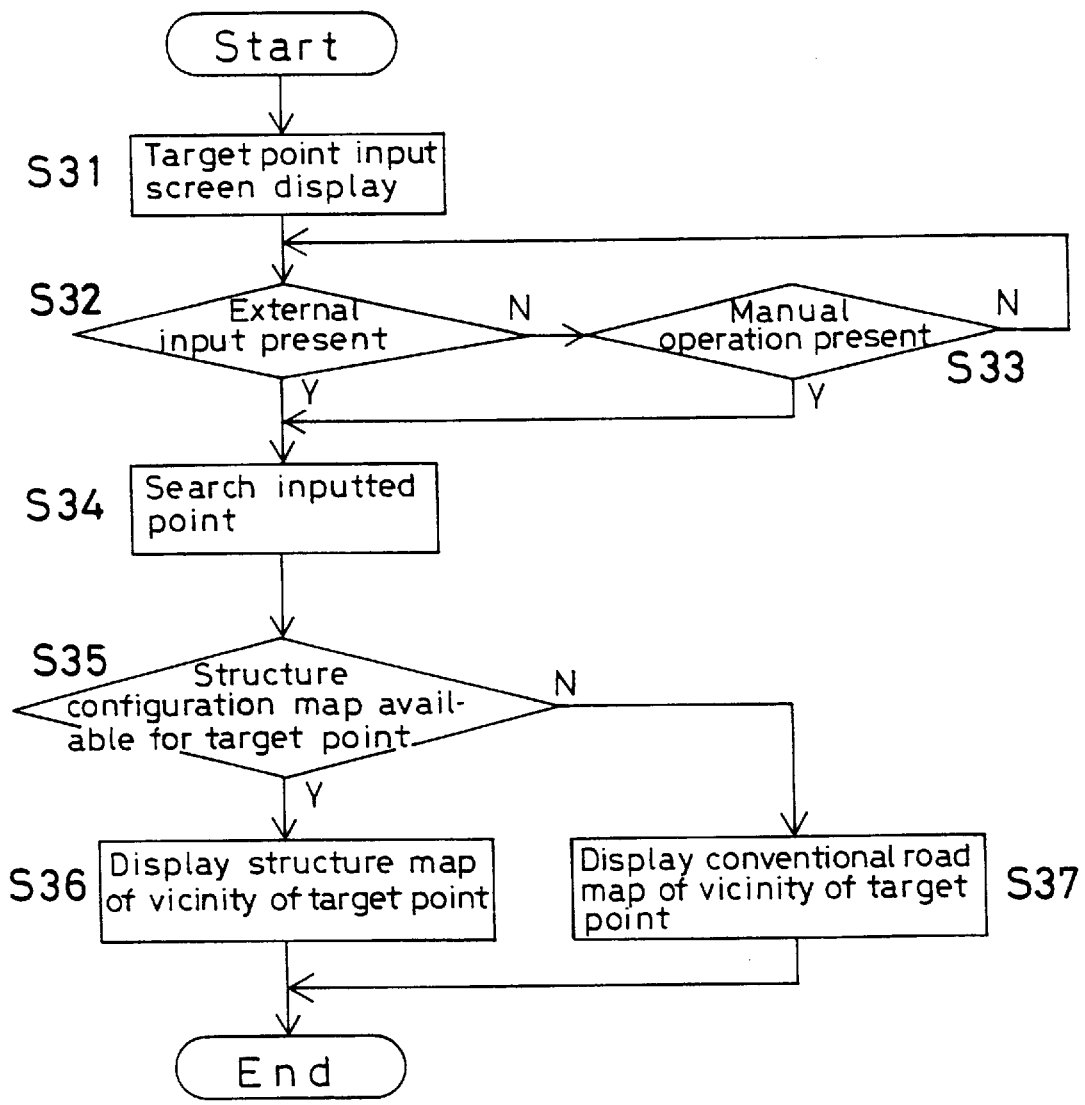
FIG. 10 is a flow chart of a subroutine for setting a target point.
Figure 11A:
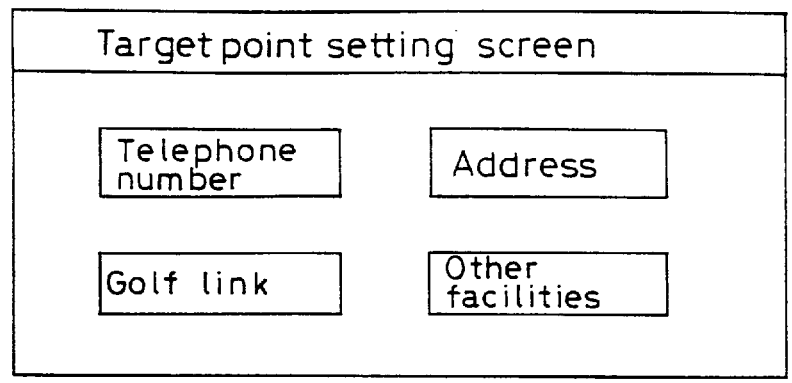
FIGS. 11(*a*), 11(*b*) and 11(*c*) show target point setting screens.
Figure 11B:
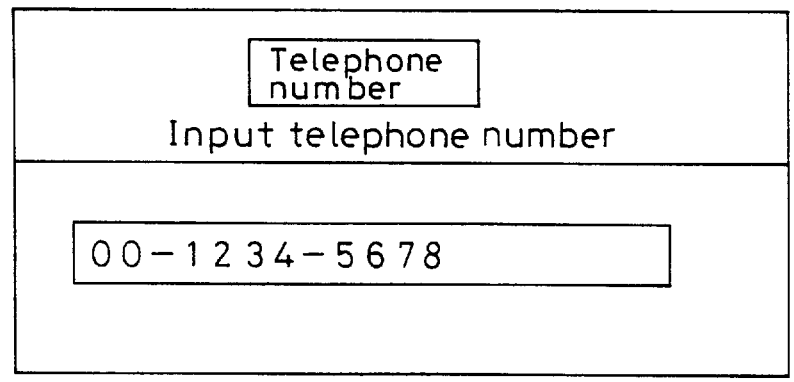
Figure 11C:
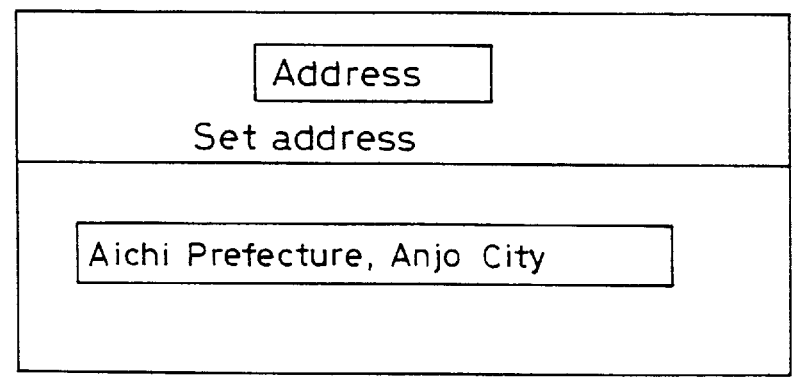

In FIG. 10, a target point input screen is first displayed (S31). On this target point input screen, a menu of input items such as telephone number, address, golf link, and other facilities is displayed as shown in FIG. 11 (a). If "telephone number" is selected, a telephone number input screen appears as shown in FIG. 11(b). If "address" is selected, an address input screen appears as shown in FIG. 11(c). FIG. 11(c) shows, by way of example, input of the address "Aichi Prefecture, Anjo City, . . . " In practice, however, the screen is scrolled, and each part of the address is separately and consecutively selected and input "Aichi Prefecture", "Anjo City", etc. Next, in Step S32, it is judged whether or not there is external input. Specifically, in the case where target point information is input from the portable electronic device 500, as explained in connection with FIG. 9, the input point is searched (S34). If there is no external input, it is judged whether or not input has been made by manual operation (S33). If there has been input by manual operation, the inputted point is searched in the same manner. In case target point information is input in advance to the storage unit 100 by the portable electronic device 500, the data is read by manual operation and is input. Next, it is judged whether or not a structure configuration map is available for the desired (target) point (S35). If available, a structure configuration map of the vicinity of the desired point is displayed (S36). If not, a conventional road map of the vicinity of the desired point is displayed (S37).

While input has been described as being by telephone number and address, input may be of a simplified map in the case of external input. Specifically, a simplified map of the vicinity of the destination may be input through the portable electronic device, and the features of the inputted map, in particular, the target point, based on the facilities, road configuration and place names in the vicinity of the destination on the structure configuration map, is searched, and guidance may be provided by a map which indicates the point located by the search. A map may be input by reading by means of a scanner, instead of input through a portable electronic device. Alternatively, the central processing unit may be designed to search for information related to the target point, (such as facility) identified by external input, in the detailed information stored in the form of the structure configuration map, and the results of the search may be output to the portable electronic device.

Further, information in addition to that stored in the form of the structure configuration map may be input from an external source and stored in the storage unit, and this additional data may be searched as necessary. The information pertaining to the target point input from an external source, e.g. in case of a building, structure, the information such as name, telephone number, address, business hours, etc., may be output from a navigation system to the external unit 500 and there utilized.

In addition, it is possible to provide for automatic search for a route passing through the target point input from an external source. For example, suppose that point A, point B, point C, point D, and point E are stored in the external unit and that the vehicle is to be driven along the National Highway No. 1 10 between point B and point C, while the road between point C and point D should be avoided (detoured). Then, the central processing unit can automatically search for a route to the final destination, i.e. point E, without driving along the road between point C and point D. Thus, it is possible to provide guidance for a route in accordance with special requirements of the user. In calculating the route, it may be designed in such manner that, by inputting only information identifying the target point, a route passing through all points from the present position or from the departure point is searched to determine which of these points should be passed through in an optimal route.

Figure 12:
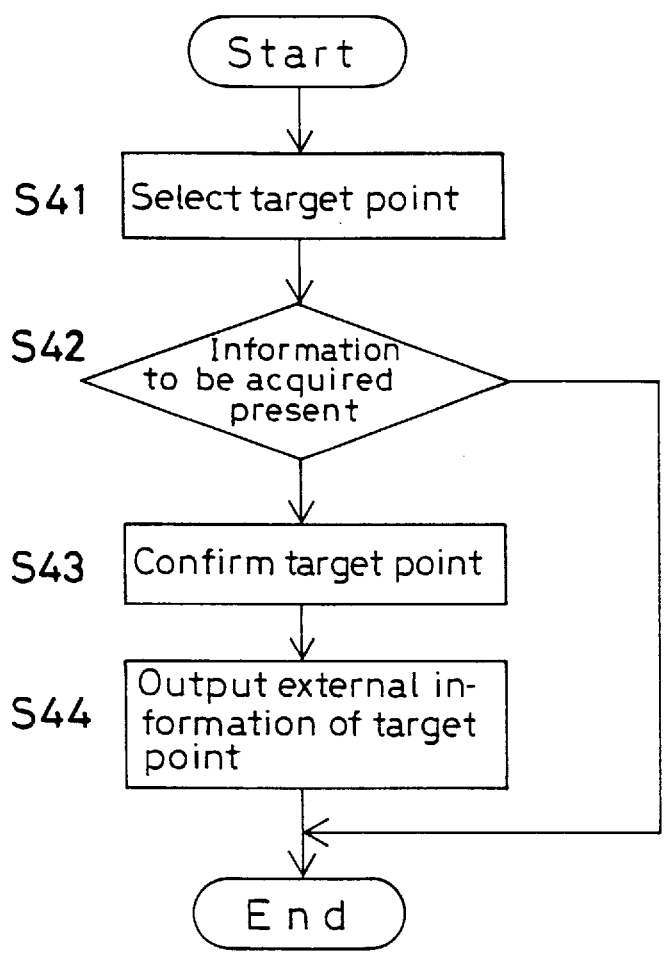
FIG. 12 is a flow chart of a subroutine for target point information external output processing.

FIG. 12 illustrates processing of information for target point and transfer to an external terminal. First, in Step S41, the target point is selected, and if there is any information to be acquired in relation to this point, when this point is established (S42–S43), detailed information as shown in FIG. 3, e.g. name, telephone number, address, business hour, etc., is output to the external terminal (step S44).

As described above, it is possible according to the present invention to connect the navigation system with a memory where information from a personal computer, note type electronic device, etc., is stored. By transferring telephone numbers and addresses stored in external memory to the navigation system, the user has no need to repeatedly input data for each target point input. This facilitates the input operation and improves the versatility of the system. Because the information stored in the system can be transferred to the memory of an external electronic device, information can be exchanged to and from the external storage unit, and the information stored both in the navigation system and in the external electronic device can be more effectively utilized. Additional information pertaining to the target point and registration of target point, by transferring information for the target point stored in the external electronic device is easily accomplished.

Figure 13:
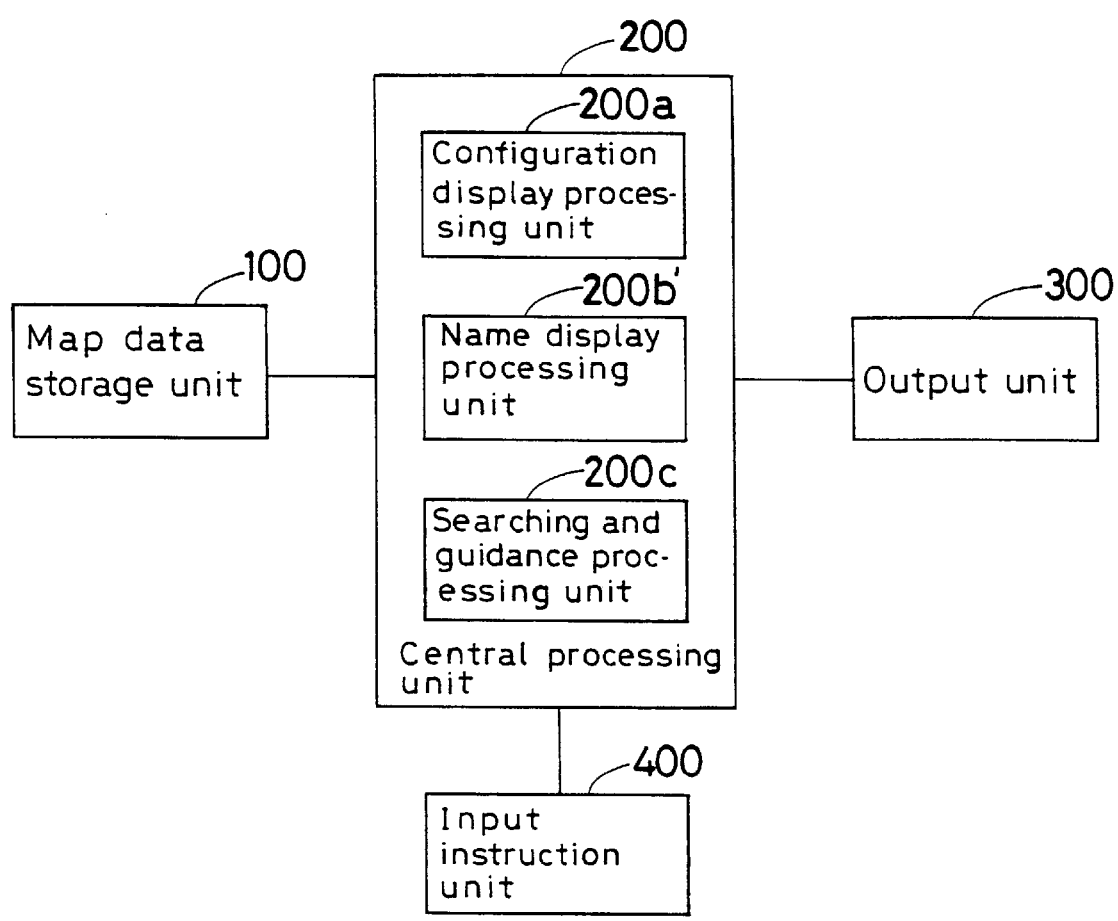
FIG. 13 is a block diagram of a third embodiment of the present invention.

FIG. 13 shows another embodiment wherein the basic arrangement is the same as in FIG. 1. However, in the embodiment of FIG. 13 the central processing unit 200 includes a name display processing unit 200b' instead of the display form change processing unit 200b. The name display processing unit 200b' is the same as in the embodiment of FIG. 9, and it depicts and displays the names of major features on the configuration map displayed by the configuration display processing unit 200a.

Figure 14:
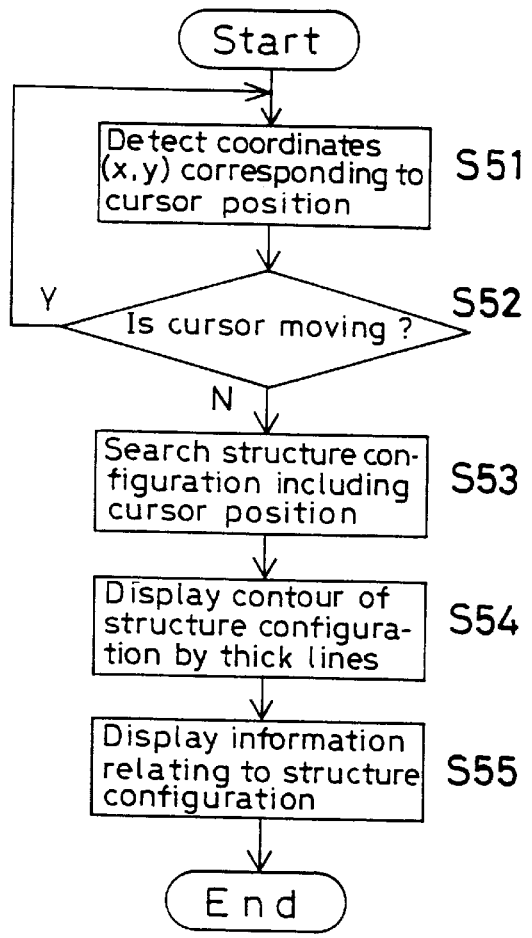
FIG. 14 is a flow chart of a subroutine for setting a target point.
Figure 15:
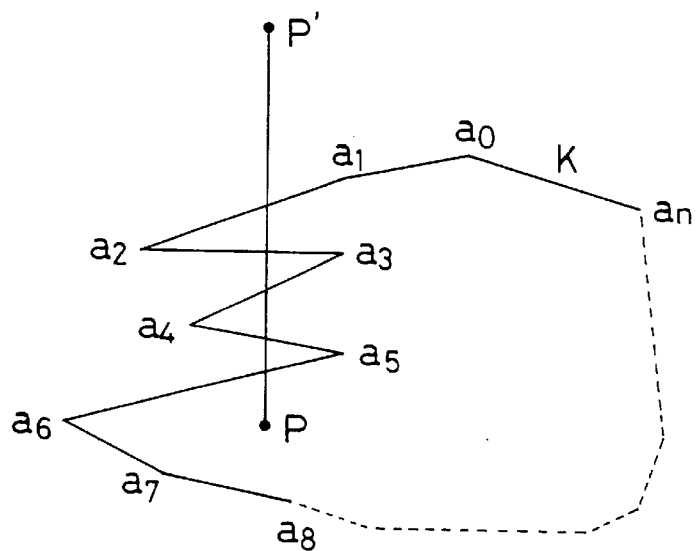
FIG. 15 is a drawing illustrating judgment processing for determining whether or not the position of the cursor is included in a given target.

Referring now to FIG. 14 and FIG. 15., as described above, rows of coordinates stored as configuration data are read in succession and then connected by lines to display a map as shown in FIG. 5. The road map shown in FIG. 5(a) is then converted to a structure configuration map as shown in FIG. 5(b) and displayed. Next, on the structure configuration map, when the cursor KL is moved to the target point as shown in FIG. 8, the desired structure is displayed with emphasis. For display with emphasis, the structure may be provided with diagonal lines or it may be indicated by thick lines or may be colored. Alternatively, information pertaining to the structure such as name and address may be displayed.

To display the structure configuration with emphasis, the coordinates (x, y) corresponding to the position of the cursor are detected (S51 in FIG. 14), and it is determined whether or not the cursor is moving, and when the cursor stops, the structure including the position of the cursor is searched in the structure data as exemplified in FIG. 3 (S52–S53)

Determination of whether or not the position of the cursor is included in a given structure is illustrated in FIG. 15. In determining whether or not a point P (x, y) is within polygon K=$a_0$ $a_1$ $a_2$ . . . $a_{n-1}$ $a_n$, a point P' (x, y') is assumed, which point has sufficiently high y' value and is considered to be above all of the points $a_0$, $a_1$, $a_2$, . . . $a_n$ with respect to the polygon K and the point P, and it is supposed that a line segment connecting P with P' is L (P, P'). It is then determined whether or not the line segment L (P, P') and each side $a_1$ to $a_{i+1}$ of the polygon K cross each other. However, if the line segment L passes through a vertex of the polygon, the line segment L is translated (moved in parallel) to left or right and this relocated line is regarded as L. If the number of sides, which cross the line segment L is an odd number, the point P is within the polygon K. If it is even number, the point P is outside the polygon K.

Therefore, a line segment is drawn extending from the position of the cursor through the contour of a structure, and by determining the number of crossing points of the contour and the line segment, it is judged whether or not the cursor is within the scope of a given structure. If it is judged that it is included, the contour of the applicable structure is displayed with emphasis, i.e. with thick lines (S54), and information such as name, address, etc., of the structure is displayed (S55). The display with emphasis is not limited to a display with thick lines, and the structure may be displayed in color or may be provided with diagonal lines as already explained. When the structure including the cursor position is displayed with emphasis, the user can readily recognize the target point at first glance.

As described above, cursor position is detected and the applicable structure is displayed with emphasis and, at the same time, information relating to the structure is communicated to the user. However, the present invention is not so limited. Specifically, it suffices that the structure can be specified with respect to the position of the cursor. This objective can be attained with only the structure emphasized by the display or with only communication of information relating to the structure. Accordingly, a display with only emphasis of the structure or only the information relating to the structure may be provided.

In the routine shown in FIG. 14, it is detected whether or not the cursor is moving, and if the cursor stops, configuration of a structure including the cursor position is searched. However, it may be designed in such manner that the speed of movement of the cursor is detected and, if slower than a predetermined speed, configuration of the structure including the cursor position may be searched. Movement of the cursor at a speed higher than the predetermined speed, means that the user does not want the information of that particular point in most cases. On the other hand, if the speed of the cursor is slower than the predetermined speed, it is assumed that the cursor position is near the point desired by the user. Then, the configuration of the structure including the cursor position is searched and the structure is displayed with emphasis and/or information relating to the structure is communicated. When execution of routines such as searching, displaying, notifying, etc., are omitted when the moving speed of the cursor is faster than the predetermined speed, it is possible to eliminate unnecessary display and/or notification. By reducing unnecessary processing, it is possible to increase the speed of other processing.

When a cursor is moved on a map screen to set a target point, it is difficult in a conventional type system to judge which point the cursor indicates. In the present invention, the position of the cursor is searched and configuration of the structure existing at this position is determined. Utilizing configuration data for the structure, the contour (border) of the structure, for example, can be displayed with emphasis or the structure can be displayed in color, and information relating to the structure such as name, address, etc., of the target point is displayed. As a result, the user can easily recognize the position indicated by the cursor and set the target point in a reliable manner.

Figure 16:
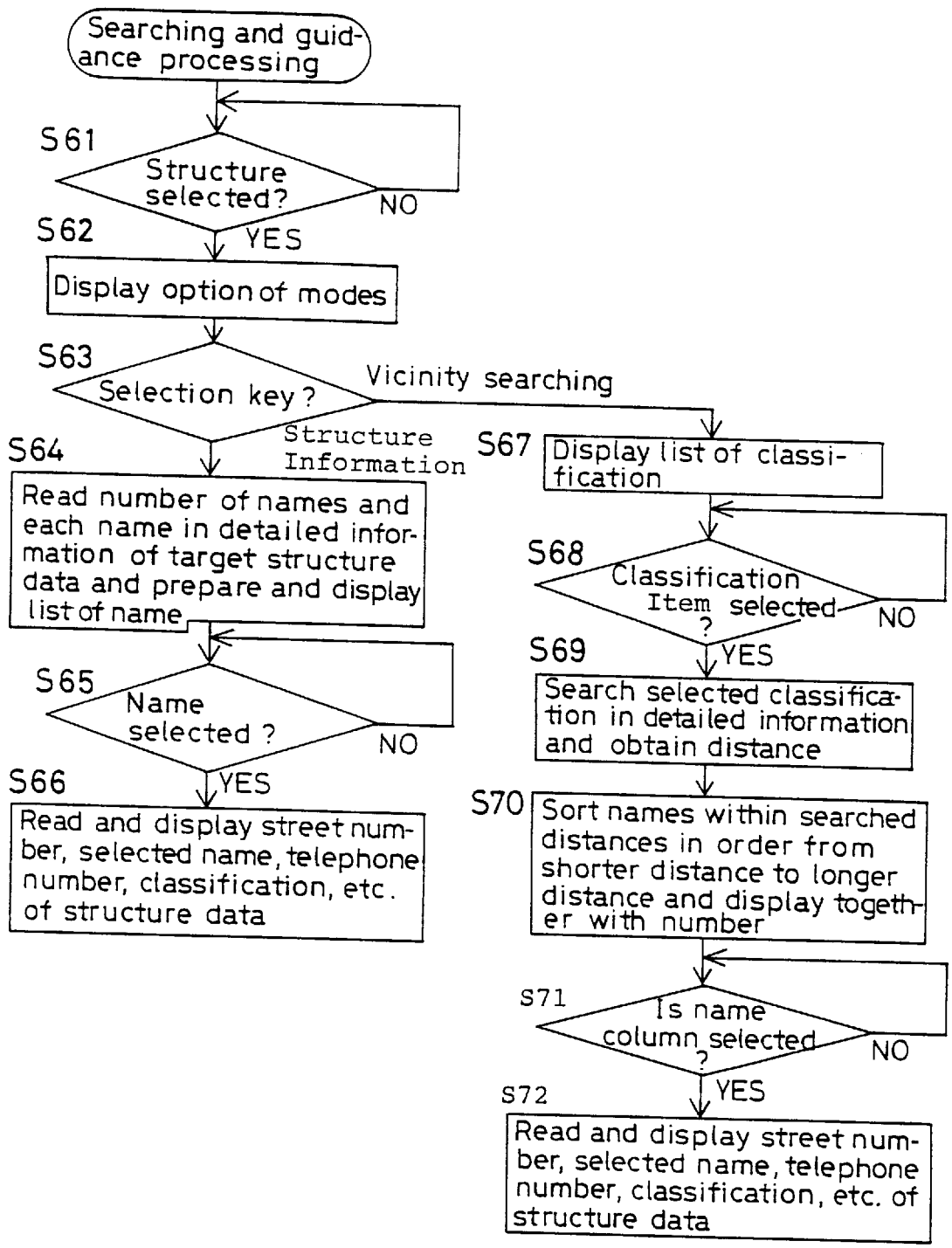
FIG. 16 is a flow chart of a subroutine for searching and guidance according to a structure configuration map.
Figure 17:
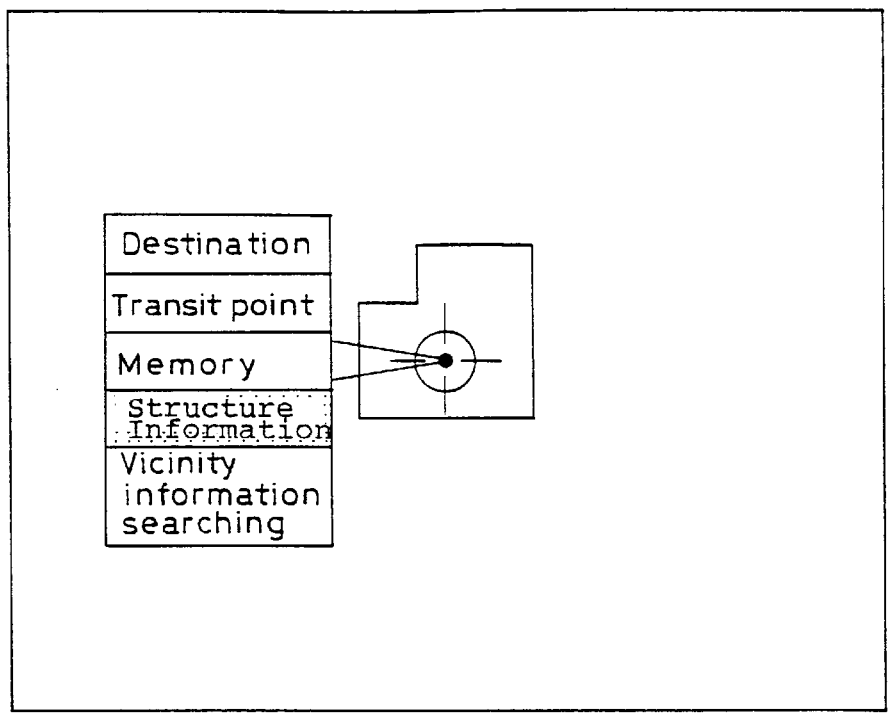
FIG. 17 shows an example of a screen, with menu, for use in a structure selecting operation based on the structure configuration map.
Figure 18:
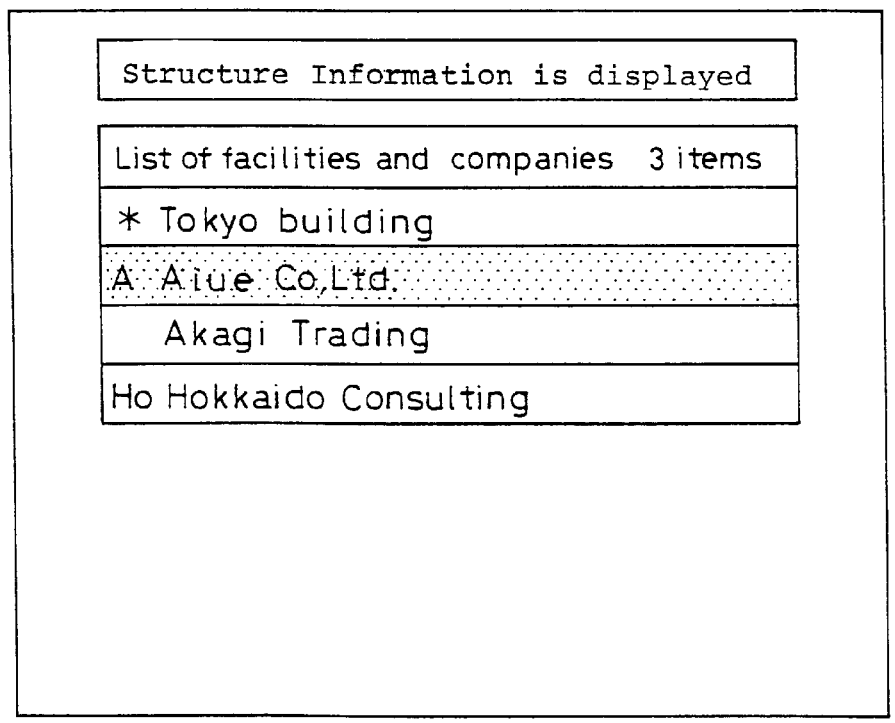
FIG. 18 is an example of an information menu display screen.

FIG. 16 is a flow chart of a routine for searching and guidance based on the structure configuration map. FIG. 17 shows an example of a screen showing a menu for a structure which has been selected from the structure configuration map, FIG. 18 represents an example of an information menu display screen, FIG. 19 shows an example of a guidance screen displaying information based on the structure configuration map, FIG. 20 shows an example of a menu display screen for searching for information relating to the vicinity of the selected structure, and FIG. 21 represents an example of a category menu screen.

When the structure configuration map displayed as described above is used, it is possible not only to search the structure but also information relating to its vicinity based on the data organized as illustrated in FIG. 3, and further, to provide information pertaining to the structure itself. For example, in the structure configuration map, a cursor having a cross in a circle is displayed at the center of the structure as shown in FIG. 17. To initiate searching and guidance, an instruction to select the structure is input using the input instruction means, and the user waits until the structure is selected as shown in FIG. 16 (Step S61). When the structure is selected, various search options such as destination or transit point, memory information, vicinity information searching, etc., are displayed in a menu (S62). The destination or transit point and memory are used for setting the target point for searching a route when the system of the present invention is incorporated into a navigation system for a vehicle as described later.

In step S63 it is determined if the selection key indicates a request for information pertaining to the selected structure or vicinity information. In the case of selection of structure information ("Information") from the menu shown in FIG. 17, the number of names and each name included in the detailed information for the applicable structure are read (see FIG. 3A). A list of the names is prepared in the order of Japanese syllabary, and the list is displayed as a menu as shown in FIG. 18 (Step S64). When a name (item) in the menu list, e.g. Aiue Co., Ltd., as shown in FIG. 18, is selected (Step S65), street number (address), the selected name, telephone number, classification, etc., are read from the data for the structure, and name, telephone number and address of Aiue Co., Ltd. are displayed as shown in FIG. 19 (Step S66) The menu items such as return, destination, transit point and memory displayed on upper portion of the screen of FIG. 19 serve as operation keys. If one of these keys is selected, the processing (routine) indicated by the key is executed by interrupting the previous routine. In the case of an instruction other than the selection of a name from the menu of FIG. 18, the processing corresponding to the instruction is executed by interrupting the previous routine.

In case of selection of vicinity information searching from the menu of FIG. 17 (Step S63), a category menu list (list of classification) such as "manufacture and sale of textile and woven goods", "dyeing and design of textile and woven goods", etc., is displayed as a menu of the vicinity information as shown in FIG. 20 (Step S67). When a certain item is selected from the menu of FIG. 20 (Step S68), the selected item is searched from the detailed information data, and a distance to the selected structure is obtained (Step S69). Then, the names of selected category items within the route over that distance are sorted in the order of shorter distance to longer distance, and the category with number of items therein, and the names of the category items and distances from the searched point are displayed as in FIG. 21 (Step S70). When one of the names in the name menu (FIG. 18) is selected (Step S71), street number (address), the selected name, telephone number, classification, etc., are read from the structure data and displayed as in FIG. 19 (Step S72). Here, if the return key is operated, the structure configuration map for the vicinity of the structure is displayed. Naturally, the structure configuration map may be displayed by operation of another key not shown here or the map may be switched over to another map such as a road map. In the case of an instruction other than selection of a classification from the menu of FIG. 20 in Step S68 or in the case of an instruction other than selection of an item from the menu of FIG. 21 in Step S71, the other processing corresponding to the instruction is executed by interrupting the routine.

When the information guidance system based on a structure configuration map of the present invention is utilized, information for companies, offices, stores, other agencies, etc., in the building and further, telephone numbers and other data for individual companies can be found from the structure configuration map. Then, companies, stores, agencies, etc., within a certain distance from the structure can be determined by search and listed, and the structure can be searched. Alternatively, the telephone number or name may be input, and by searching the name and the telephone number among the names and telephone numbers in the same map data or the detailed information shown in FIG. 3, the structure configuration map around the structure can be displayed. Therefore, if the user has a rough identification of the target structure such as name or classification and of its geographical location, but cannot find the structure itself, it is possible to locate the structure, e.g. the building, housing a specified destination by search or to provide information for a tenant of a certain building. If this embodiment is utilized to set the target point in a navigation system for a vehicle, it offers the advantage that a target point in an urban area can be easily set. Further, if a road segment is the specified target, and information as to presence or absence of parking meters is provided in storage as information relating to the specified road segment, parking information can be output.

Figure 22:
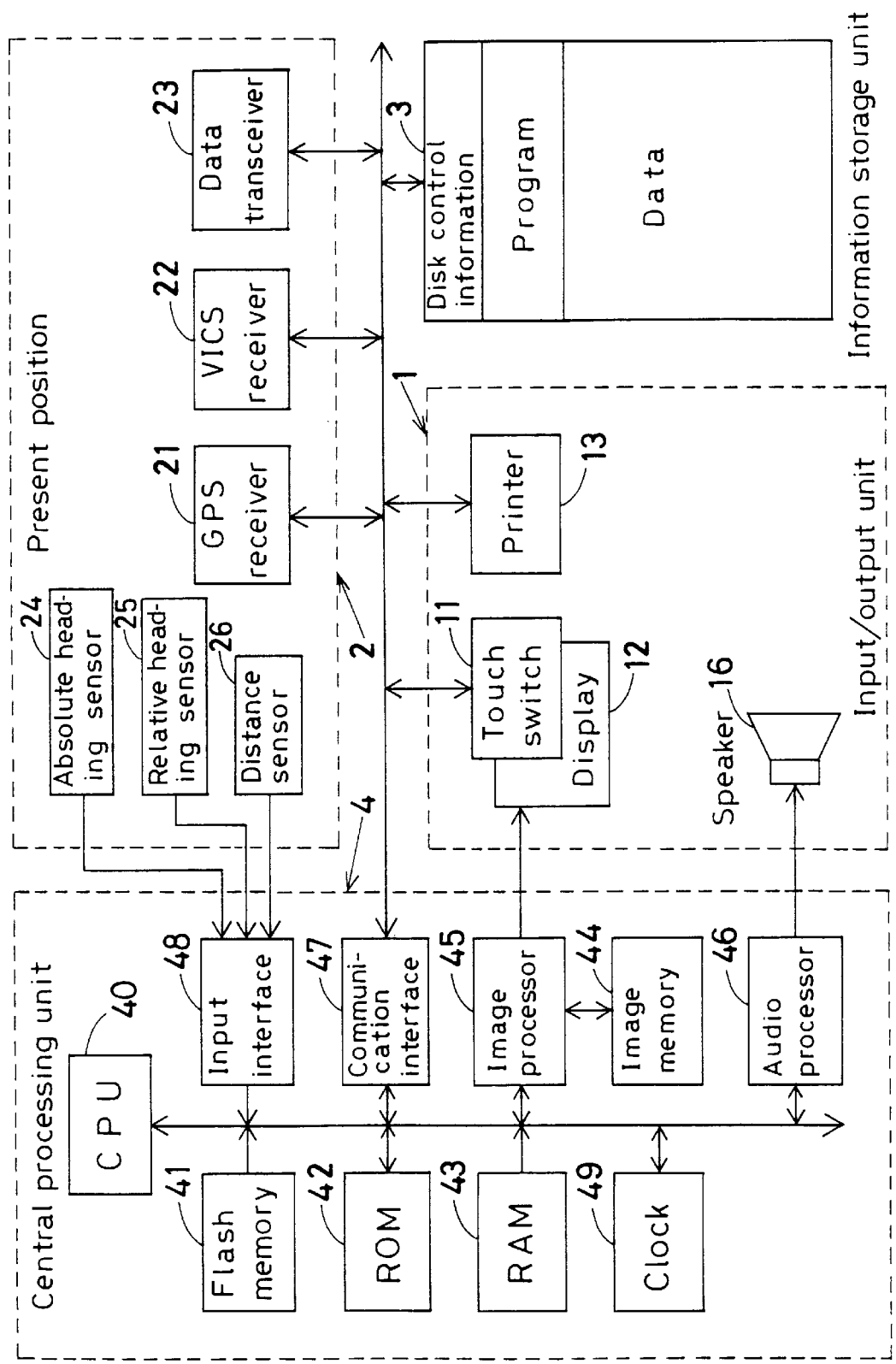
FIG. 22 is a block diagram of an embodiment of a navigation system for a vehicle, which includes an information guidance system, based on a structure configuration map, according to the present invention.

FIG. 22 depicts a system including an embodiment of a navigation system for vehicles wherein information guidance is based on a structure configuration map according to the present invention. The illustrated navigation system includes an input/output unit 1 for inputting and outputting information relating to route guidance, a present position detecting unit 2 for detecting information relating to the present position of the user's vehicle, an information storage unit 3 for recording navigation data for calculating a route, display/voice guidance data and programs (application and/or OS) necessary for route guidance, etc., and a central processing unit 4 for executing processing of display/audio guidance necessary for route searching or route guidance and for controlling the entire system.

The input/output unit 1 gives navigation processing instruction to the central processing unit 4 in accordance with the intention of the driver of the vehicle so that the destination is input or guidance information can be output by voice and/or on screen when the driver needs such information, and prints out the data. As the means for executing the above functions, the input unit is provided with a touch switch 11 or an operation switch for inputting the destination using telephone number or coordinates on a map or for requesting route guidance. Of course, an input unit such as remote controller may be used. The output unit comprises a display 12 for displaying the input data on screen or for automatically displaying route guidance on screen at the request of the driver, a printer 13 for printing out the data processed by the central processing unit 4 and the data stored in the information storage unit 3, and a speaker 16 for outputting route guidance in voice form.

It is possible to add a voice recognizer for achieving voice input or a card reader for reading the data recorded on an IC card or a magnetic card. Also, a data communication unit may be added, by which it is possible to exchange information to and from an information center for accumulating the data necessary for navigation and for providing information via a communication line at the request of the driver and also to and from an information source, such as a note type electronic device wherein the data specific to the driver, including map data or destination data, are stored in advance.

The display 12 comprises a color CRT and a color liquid crystal display unit and displays in color all screens necessary for navigation such as a route setting screen, sector view screen, intersection view screen, etc., based on map data and guidance data processed by the central processing unit 4. At the same time, buttons for setting route guidance and for switching guidance and screens during route guidance are displayed on this screen. In particular, transit intersection information, such as transit intersection names, is displayed in pop-up color on the sector view screen when necessary.

The display 12 is installed on an instrument panel near the driver's seat, and the driver confirms the present position of the vehicle by watching the sector display and can obtain information on the route ahead. The display 12 is provided with a touch switch 11 to correspond to the display of functional buttons. By touching the button, the above operation is carried out based on the input signal. The input signal generating means, comprising the buttons and the touch switch, constitutes the input unit, a detailed description of which is omitted here.

The present position detecting means 2 comprises a GPS receiver 21 for obtaining information using the present position satellite navigation system (global positioning system) of the vehicle, a VICS information receiver 22 for obtaining information by means of FM multiplex broadcasting, radio beacon, optical beacon, etc., a data transceiver 23 for two-way communication of information to and from an information center (such as ATIS) or other vehicles by means of portable telephone, personal computer, etc., an absolute heading sensor 24 for detecting the direction of advance of the vehicle as an absolute heading by utilizing geomagnetism, a relative heading sensor 25 for detecting the advancing direction of the vehicle by utilizing steering sensor or gyro sensor, and a distance sensor 26 for detecting driving distance of the vehicle from number of wheel revolutions, for example. It is used to transmit or receive information relating to the driving of the vehicle such as road information or traffic information, or to detect and/or transmit and/or receive information relating to the present position of the vehicle.

The information storage unit 3 is an external storage unit for storing programs and data for navigation, and it comprises a CD-ROM, for example. The following programs and data are stored in unit 3: programs for executing routines such as route searching, automatic re-searching (vicinity route searching, all-route searching), etc., routines as shown in the flow charts of the present application, routines for executing the display output control necessary for route guidance and audio output control necessary for voice guidance, and the data necessary for execution of such routines, and display information data necessary for route guidance and map display. The stored data includes files of map data, search data, guidance data, map matching data, destination data, registered point data, road data, data for each category, and all data necessary for operation of the navigation system. In the present invention, only the data are stored in CD-ROM, and the routines which operate on the data are stored in the central processing unit.

The central processing unit 4 includes a CPU 40 for executing various calculations, a flash memory 41 for reading and storing programs taken from the CD-ROM of the information storage unit 3 and for storing them, a ROM 42 for storing the programs for executing program check and updating of the flash memory 41 (program reading means) and a RAM 43 for temporarily storing the searched route guidance information such as coordinates of the preset destination, road name code number, etc., and/or the data used in arithmetic processing. Unit 4 further includes an image memory 44, which stores image data used for screen display and an image processor 45 for picking up image data from the image memory 44 based on display output control signals from CPU 40 and for outputting the data to display after image processing. A voice processor 46 synthesizes voice, e.g. phrases, a single sentence, etc., read from the information storage unit 3, based on the voice output control signals from the CPU which are converted to analog signals for output to the speaker 16. A communication interface 47 transmits and receives input/output data. A sensor input interface 48 correlates sensor signals from of the present position detecting unit 2 with time data from a clock 49 for entering date and time for internal dialog information. Route guidance is provided both by screen display and by voice output, and the driver can select whether or not to have voice output.

A program for executing updating as described above may be stored in the external storage unit.

The programs relating to the previously described invention and programs for executing navigation may all be stored in CDROM, which serves as an external storage medium, or a part or all of these programs may be stored in ROM 42 on the main unit side.

When the data and the programs stored in the external storage medium are input to the central processing unit of the navigation system main unit and arithmetic operations are performed, various navigational functions can be carried out.

The navigation system in accordance with the present invention is provided with a relatively large capacity flash memory 41 for reading programs from the CD-ROM of the external storage unit and with a small capacity ROM 42, which stores programs for rise-up processing of the CD (program reading means). The flash memory 41 maintains stored information even when power is suspended, i.e. it is an involatile storage means. In the rise-up processing of the CD, a program of ROM 42, serving as program reading means, is started to check the programs stored in the flash memory 41, and disk control information for the CD-ROM of the information storage unit 3 is read. The loading of the program (updating) is carried out on the basis of information in and the status of the flash memory 41.

The present invention is not limited to the above embodiments, and various changes and modifications can be made. For example, in the above embodiments, while only names of structures are mentioned, street names and/or district names may be included. While, in the foregoing, the processing of all names is described, priority thereof may be displayed on a map in advance or information as to whether display is present or not may be set and may be attached to the name, and the name may be displayed based on such information. Alternatively, processing may be executed as to only structures having greater than a predetermined number of named tenants or more than a predetermined height. In the foregoing rows of coordinates (x, y) are described as the data for expressing structure configuration, but coordinate values (z) for height may be included to provide 3-dimensional coordinate data. In the case of a plan view, only the rows of coordinates (x, y) are used, and in the case of a view seen diagonally from above or in a simulated 3-dimensional configuration, such as a perspective view, rows of coordinates (x, y, z) may be used. Further, while the system of the present invention can provide elaborate geographical guidance when incorporated into a navigation system it can also be used alone for guidance in urban areas and tourist resorts, and the information may be printed and offered as a service.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. A guidance system for providing guidance information based on a structure configuration map, comprising:

storage means for storing data including structure configuration map information including configurational data for structures in the form of rows of coordinates, each row of coordinates representing a structural configuration of an individual structure, said structures including buildings and other facilities, and for storing structure information relating to the structures;

structure configuration map display control means for depicting and displaying a structure configuration map showing structural configurations of the buildings and other facilities based on the structure configuration map information stored in said storage means;

searching and guidance processing means for searching and providing guidance to one of the structures as a target point; and display form change control means for reading data from said storage means according to the structure information relating to the target point, for determining a display form which characterizes said one structure and which distinguishes said one structure from the remainder of the displayed structure configuration map and for changing the displayed structure configuration map to depict said one structure in the determined display form.

2. A guidance system according to claim 1, wherein the determined display form is a representation of the type and area of the structure which is the target point.

3. A guidance system according to claim 1, wherein the determined display form is a simulated 3-dimensional representation of the structure at the target point.

4. A guidance system according to claim 3 wherein each row of coordinates represents a planar configuration of said individual structure.

5. A guidance system according to claim 1, wherein said display form change control means erases display of structures other than the structure of the target point.

6. A guidance system according to claim 1, further comprising:

input/output control means for controlling input and output of information to and from an external electronic device;

searching means for searching information externally input from an external electronic device; and notifying means for notifying a user of information searched and externally input.

7. A guidance system according to claim 6, further comprising:
   decoding means for decoding information externally input from an external electronic device, and
   wherein said searching means searches for a target point in the structure configuration map information stored in said storage means based on the externally input information decoded by said decoding means.

8. A guidance system according to claim 1, further comprising:
   operating means for selecting a site as a target point;
   coordinate detecting means for detecting coordinates indicated by the site selected by said operating means;
   searching means for searching for a structure including the coordinates detected by said coordinate detecting means; and
   wherein said structure configuration map display control means determines a display form for the structure including the detected coordinates.

9. A guidance system according to claim 8, further comprising notifying means for notifying a user of information relating to the structure including the detected coordinates.

10. A guidance system based on a structure configuration map according to claim 9, further comprising motion detecting means for detecting speed of movement of said operating means relative to the displayed structure configuration map and wherein said coordinate detecting means becomes operative only when the detected speed of movement is slower than a predetermined speed.

11. A guidance system according to claim 9, wherein contour of the structure including the detected coordinates searched by the searching means is displayed with thick lines for emphasis by said display form change control means.

12. A guidance system according to claim 9, wherein the structure related information includes name and address of the structure.

13. A guidance system based on a structure configuration map according to claim 8, further comprising motion detecting means for detecting speed of movement of said operating means relative to the displayed structure configuration map and wherein said coordinate detecting means becomes operative only when the detected speed of movement is slower than a predetermined speed.

14. A guidance system according to claim 8, wherein the structure including the detected coordinates is displayed with color for emphasis by said display form change control means.

15. A guidance system according to claim 1 wherein each row of coordinates represents a planar configuration of said individual structure.

* * * * *